(12) United States Patent
Goto et al.

(10) Patent No.: US 6,813,423 B2
(45) Date of Patent: Nov. 2, 2004

(54) BROADBAND OPTICAL SPECTRUM GENERATING APPARATUS AND PULSED LIGHT GENERATING APPARATUS

(75) Inventors: Toshio Goto, Aichi-ken (JP); Norihiko Nishizawa, Aichi-ken (JP)

(73) Assignee: Nagoya Industrial Science Research Institute, Nagoya (JP)

( * ) Notice: Subject to any disclaimer, the term of this patent is extended or adjusted under 35 U.S.C. 154(b) by 0 days.

(21) Appl. No.: 10/647,293

(22) Filed: Aug. 26, 2003

(65) Prior Publication Data

US 2004/0105637 A1 Jun. 3, 2004

Related U.S. Application Data

(63) Continuation of application No. PCT/JP02/00579, filed on Jan. 28, 2002, now abandoned.

(30) Foreign Application Priority Data

| Mar. 2, 2001 | (JP) | 2001-058235 |
| Mar. 2, 2001 | (JP) | 2001-058241 |

(51) Int. Cl.$^7$ ................................................. G02B 6/00
(52) U.S. Cl. ....................... 385/122; 359/240; 359/328
(58) Field of Search .............................. 385/15, 24, 27, 385/28, 122

(56) References Cited

U.S. PATENT DOCUMENTS

| 5,960,146 | A | | 9/1999 | Okuno et al. | |
| 6,347,174 | B1 | * | 2/2002 | Onishi et al. | 385/122 |
| 6,522,818 | B1 | * | 2/2003 | Aso et al. | 385/122 |
| 6,618,531 | B1 | * | 9/2003 | Goto et al. | 385/122 |

FOREIGN PATENT DOCUMENTS

| EP | 1 152 557 A2 | 2/2001 |
| JP | 6-138500 | 5/1994 |
| JP | 10-90737 | 4/1998 |
| JP | 2001-222037 | 8/2001 |

OTHER PUBLICATIONS

Boyraz et al., "10 Gb/s Multiple Wavelength, Coherent Short Pulse Source Based on Spectral Carving of Supercontinuum Generated in Fibers", Journal of Lightwave Technology, vol. 18, No. 12, Dec. 2000, pp. 2167–2175.

Nowak et al., "Stabe supercontinuum generation in short lengths of conventional dispersion–shifted fiber", Applied Optics, vol. 38, No. 36, Dec. 20, 1999, pp 7364–7369.

Morioka et al., "More than 100–Wavelenghth–Channel Picosecond optical pulse generation from Single Laser Source using Supercontinuum in Optical Fiebrs", Electronics Letters, May 13, 1993, vol. 29 No. 10, pp. 862–864.

Morioka et al., Transform–limited, femtoscond WDM pulse generation by spectral filtering of gigahertz supercontinuum, Electronics Letters, Jul. 7, 1994, vol. 30 No. 14, pp 1166–1168.

Proceedings of the 1993 Fall Conference, Sep. 5–8, 1993, Sapporo, Hokkaido Institute of Technology, p 161 (with abstract).

Proceedings of the 2000 Communications Society Conference of IEICE, Sep. 30–Oct. 3, 2000, Nagoya Institute of Technology, Nagoya, p 378 (with abstract).

IEICE Technical Report, vol. 100, No. 428, p 4 (with abstract).

* cited by examiner

Primary Examiner—Akm Enayet Ullah
Assistant Examiner—Jennifer Doan
(74) Attorney, Agent, or Firm—Oliff & Berridge, PLC

(57) ABSTRACT

A broadband optical spectrum generating apparatus 20 includes an ultra-short pulse fiber laser 22 that generates pulsed light having a pulse width in a unit of picosecond to femtosecond, and a broadband optical spectrum-generating optical fiber 24 that is connected with the ultra-short pulse fiber laser 22 via a lens 26 and has a non-linear coefficient of not less than 10 $[W^{-1}m^{-1}]$ at a wavelength of the pulsed light and a magnitude of chromatic dispersion of not greater than 2 [ps/km/nm]. The pulsed light emitted from the ultra-short pulse fiber laser 22 is converted into a relatively flat super continuum over a broad band of approximately 1200 nm to 2000 nm by chromatic dispersion in the course of transmission through the broadband optical spectrum-generating optical fiber 24.

21 Claims, 9 Drawing Sheets

BROADBAND OPTICAL SPECTRUM GENERATING APPARATUS AND PULSED LIGHT GENERATING APPARATUS

CROSS-REFERENCE TO RELATED APPLICATION

This is a continuation of Application PCT/JP02/00579, filed Jan. 28, 2002, now abandoned.

BACKGROUND OF THE INVENTION

1. Field of the Invention

The present invention relates to a broadband optical spectrum generating apparatus and a pulsed light generating apparatus. More specifically the invention pertains to a broadband optical spectrum generating apparatus that generates a broadband optical spectrum as well as to a pulsed light generating apparatus that generates pulsed light having a desired wavelength in a predetermined wavelength band.

2. Description of the Prior Art

Widely broadened optical spectra called super continuum have recently drawn attention in the field of optical communication and optical measurement. A diversity of broadband optical spectrum generating apparatuses and techniques have been proposed to utilize optical fibers having nonlinear effects and thereby generate the super continuum (for example, JAPANESE PATENT LAID-OPEN GAZETTE No. 8-234249, No. 10-90737, No. 11-160744, and No. 11-174503).

Optical fibers of several hundred meters or even several kilometers are, however, required in such prior art broadband optical spectrum generating apparatuses and techniques, and are thus unpractical. Multiple amplification stages are required for excitation light, which is used for generation of super continuum. This results in undesirably complicated construction and large size of the apparatus. Additionally, the generated spectrum has a band of only approximately 1400 nm to 1700 nm.

SUMMARY OF THE INVENTION

The object of the present invention is thus to generate an optical spectrum of a broader band or more specifically a relatively flat super continuum over a broadband in a broadband optical spectrum generating apparatus. The object of the present invention is also to attain size reduction and simplified construction of the broadband optical spectrum generating apparatus. The broadband optical spectrum generating apparatus of the invention aims at generating pulsed light of an arbitrary wavelength out of a wide wavelength band.

In order to achieve at least a part of the aforementioned objects, a broadband optical spectrum generating apparatus and a pulsed light generating apparatus of the present invention are structured as follows.

A broadband optical spectrum generating apparatus of the invention generates a broadband optical spectrum, the broadband optical spectrum generating apparatus including: a short pulse light source that emits pulsed light at a short interval; and a broadband optical spectrum-generating optical fiber that has a non-linear coefficient of not less than 10 $[W^{-1} m^{-1}]$ at a wavelength of the pulsed light emitted from the short pulse light source and converts the pulsed light input from the short pulse light source into the broadband optical spectrum.

The broadband optical spectrum generating apparatus of the invention uses the broadband optical spectrum-generating optical fiber having a non-linear coefficient of not less than 10 $[W^{-1}m^{-1}]$, thus generating an optical spectrum over a broad band of approximately 1200 nm to 2000 nm. The broadband optical spectrum generating apparatus has the single short pulse light source. This arrangement effectively reduces the size and simplifies the structure of the whole broadband optical spectrum generating apparatus.

In the broadband optical spectrum generating apparatus of the invention, the broadband optical spectrum-generating optical fiber may be related to have a length of not greater than 50 m or preferably a length of not greater than 10 m. This arrangement ensures output of a more stable broadband optical spectrum. The broadband optical spectrum-generating optical fiber may be regulated to have a magnitude of chromatic dispersion of not greater than 2 [ps/km/nm] or preferably a magnitude of chromatic dispersion of not greater than 1.5 [ps/km/nm]. This arrangement ensures output of an optical spectrum of a broader band. One preferable example of the broadband optical spectrum-generating optical fiber may be a polarization maintaining optical fiber. This arrangement gives the broadband optical spectrum-generating optical fiber that stably having a high non-linearity, thus generating a more stable broadband optical spectrum.

In the broadband optical spectrum generating apparatus of the invention, the short pulse light source may output the pulsed light having a central wavelength of output pulse in a vicinity of 1556 nm and a pulse width in a unit of picosecond to femtosecond. The output pulsed light preferably has a narrower pulse width and a higher peak output. One desirable example of the short pulse light source may output the pulsed light having a pulse width of 10 to 1000 femtoseconds and a mean output of not less than 20 mW. This arrangement ensures generation of a more stable broadband super continuum.

In the broadband optical spectrum generating apparatus of the invention, the broadband optical spectrum may be relatively flat over a band of 1300 nm to 1900 nm. Here the state 'relatively flat' means that the output spectrum has a continuous wavelength and no significant variation in intensity.

In the broadband optical spectrum generating apparatus of the invention, there may be provided with a lens that is interposed between the short pulse light source and the broadband optical spectrum-generating optical fiber to make the pulsed light from the short pulse light source enter the broadband optical spectrum-generating optical fiber. This arrangement enables the pulsed light emitted from the short pulse light source to readily enter the broadband optical spectrum-generating optical fiber.

A pulsed light generating apparatus of the invention generates pulsed light of a desired wavelength in a preset wavelength band, the pulsed light generating apparatus including: broadband optical spectrum generation section including a short pulse light source that emits pulsed light at a short interval, and a broadband optical spectrum-generating optical fiber that has a non-linear coefficient of not less than 10 $[W^{-1}m^{-1}]$ at a wavelength of the pulsed light emitted from the short pulse light source and converts the pulsed light input from the short pulse light source into a broadband optical spectrum; and optical spectrum extraction section that receives a supply of the broadband optical spectrum from the broadband optical spectrum generation section and extracts an optical spectrum of an arbitrary wavelength from the received broadband optical spectrum.

In the pulsed light generating apparatus of the present invention, the optical spectrum extraction section may extract an optical spectrum of an arbitrary wavelength in the broadband optical spectrum output from the broadband optical spectrum generation section. This arrangement ensures generation of an optical spectrum of a desired wavelength, that is, pulsed light, over the broad band. The broadband optical spectrum generation section has the identical structure with that of the broadband optical spectrum generating apparatus of the invention discussed above and accordingly has the same effects as those of the broadband optical spectrum generating apparatus of the invention.

In the pulsed light generating apparatus of the invention, the optical spectrum extraction section may be a tunable filter that varies a wavelength of transmitted light. In another example, the optical spectrum extraction section may include an extracted wavelength regulator that regulates the extracted wavelength in response to an electric signal. This structure allows the wavelength of the generated pulsed light to be freely regulated.

The broadband optical spectrum-generating optical fiber used for the pulsed light generating apparatus of the invention may be regulated to have a length of not greater than 50 m or preferably to have a length of not greater than 10 m. This arrangement ensures output of a more stable broadband optical spectrum. The broadband optical spectrum-generating optical fiber may be regulated to have a magnitude of chromatic dispersion of not greater than 2 [ps/km/nm] or preferably a magnitude of chromatic dispersion of not greater than 1.5 [ps/km/nm]. This arrangement ensures output of an optical spectrum of a broader band. One preferable example of the broadband optical spectrum-generating optical fiber may be a polarization maintaining optical fiber. This arrangement gives the broadband optical spectrum-generating optical fiber that stably having a high non-linearity, thus generating a more stable broadband optical spectrum.

In the pulsed light generating apparatus of the invention, the short pulse light source may output the pulsed light having a central wavelength of output pulse in a vicinity of 1556 nm and a pulse width in a unit of picosecond to femtosecond. The output pulsed light preferably has a narrower pulse width and a higher peak output. One desirable example of the short pulse light source may output the pulsed light having a pulse width of 10 to 1000 femtoseconds and a mean output of not less than 20 mW. This arrangement ensures generation of a more stable broadband super continuum.

A short pulse light source of the invention is included in a broadband optical spectrum generating apparatus, which generates a broadband optical spectrum, and emits pulsed light to a broadband optical spectrum-generating optical fiber, which converts the pulsed light into the broadband optical spectrum, the short pulse light source outputting the pulsed light having a central wavelength of output pulse in a vicinity of 1556 nm and a pulse width in a unit of picosecond to femtosecond.

The short pulse light source of the invention is desirably applied to the broadband optical spectrum generating apparatus to generate a broadband optical spectrum.

A broadband optical spectrum-generating optical fiber of the invention is included in a broadband optical spectrum generating apparatus, which generates a broadband optical spectrum, and converts pulsed light input from a short pulse light source into the broadband optical spectrum, the broadband optical spectrum-generating optical fiber having a non-linear coefficient of not less than 10 $[W^{-1}m^{-1}]$ at a wavelength of the pulsed light emitted from the short pulse light source.

The broadband optical spectrum-generating optical fiber of the invention is desirably applied to the broadband optical spectrum generating apparatus to generate a broadband optical spectrum.

The broadband optical spectrum-generating optical fiber of the invention may be related to have a length of not greater than 50 m or preferably a length of not greater than 10 m. This arrangement ensures output of a more stable broadband optical spectrum. The broadband optical spectrum-generating optical fiber may be regulated to have a magnitude of chromatic dispersion of not greater than 2 [ps/km/nm] or preferably a magnitude of chromatic dispersion of not greater than 1.5 [ps/km/nm]. This arrangement ensures output of an optical spectrum of a broader band. One preferable example of the broadband optical spectrum-generating optical fiber may be a polarization maintaining optical fiber. This arrangement gives the broadband optical spectrum-generating optical fiber that stably having a high non-linearity, thus generating a more stable broadband optical spectrum.

DESCRIPTION OF THE PREFERRED EMBODIMENTS

Figure 1:
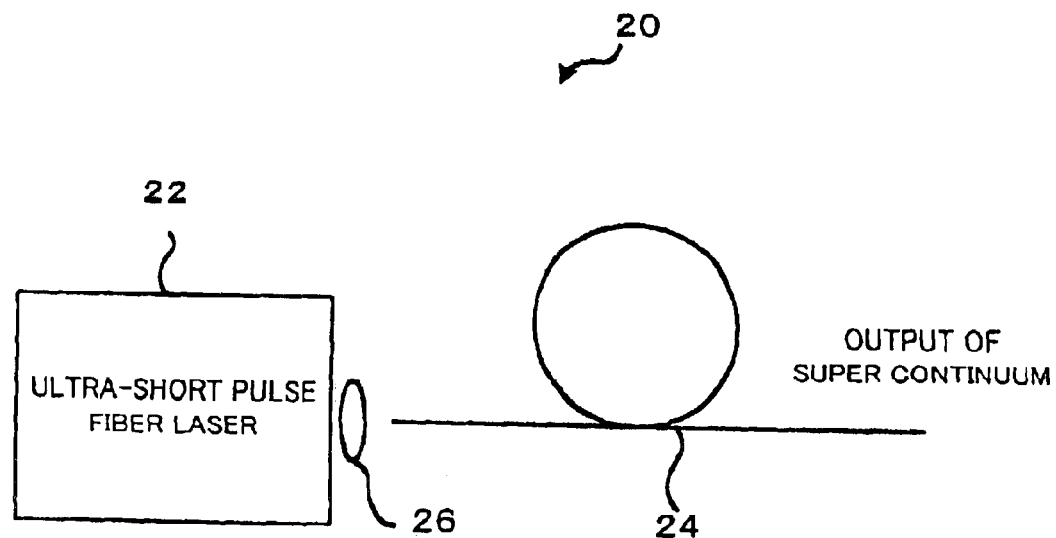
FIG. 1 schematically illustrates the construction of a broadband optical spectrum generating apparatus 20 in one embodiment of the invention.
Figure 2:
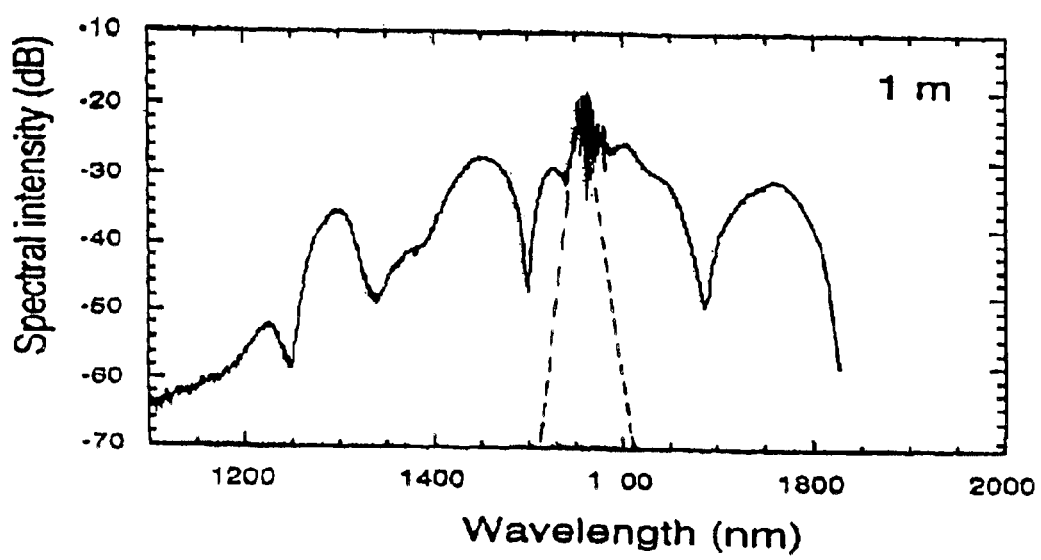
FIG. 2 is a graph showing an observed output spectrum when pulsed light having a mean output of 25 mW is emitted from an ultra-short pulse fiber laser 22 and enters a broadband optical spectrum-generating optical fiber 24 of 1 m in length.
Figure 3:
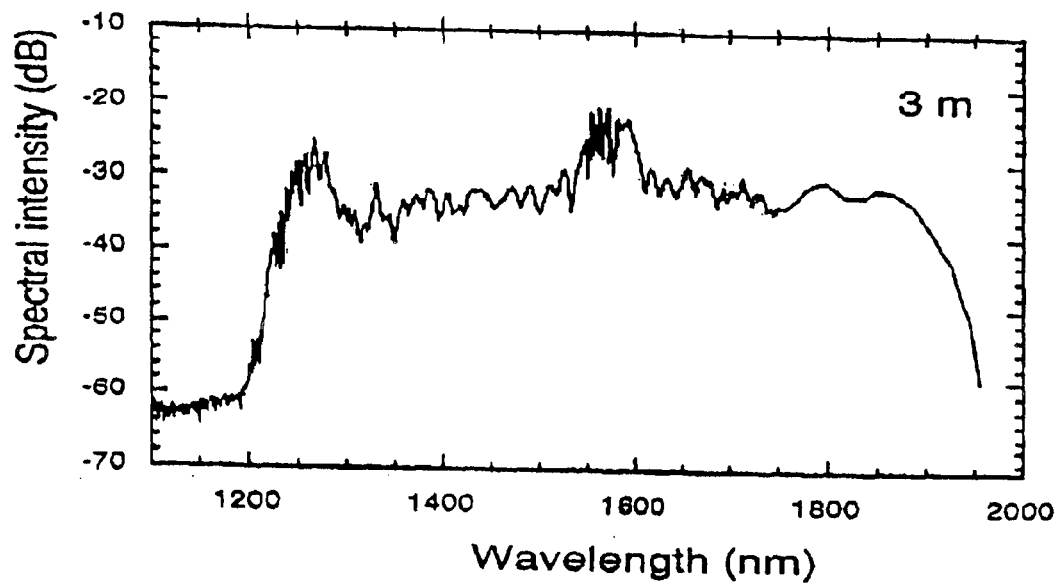
FIG. 3 is a graph showing an observed output spectrum when pulsed light having a mean output of 25 mW is emitted from an ultra-short pulse fiber laser 22 and enters a broadband optical spectrum-generating optical fiber 24 of 3 m in length.
Figure 4:
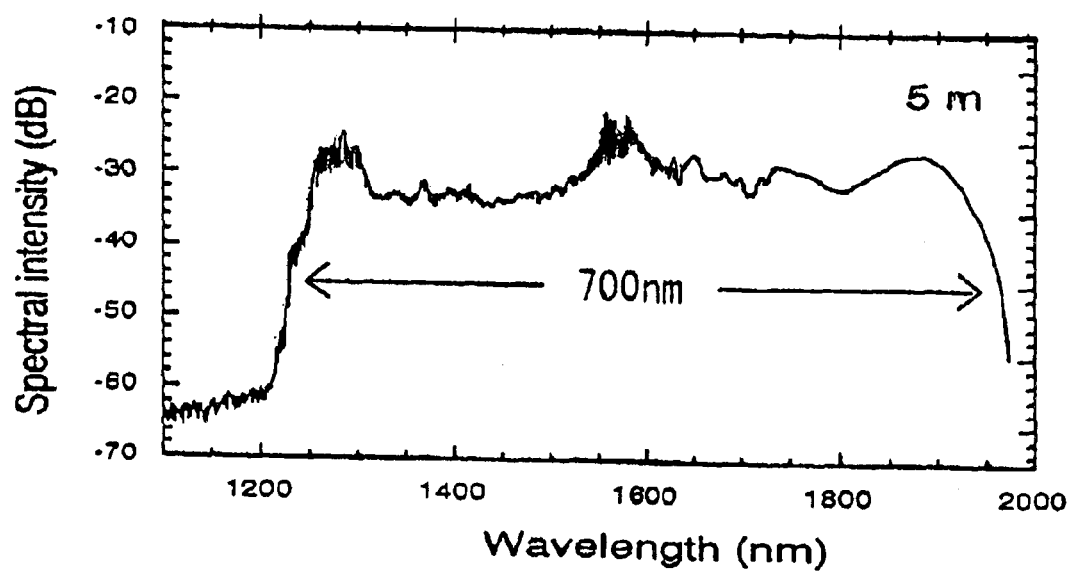
FIG. 4 is a graph showing an observed output spectrum when pulsed light having a mean output of 25 mW is emitted from an ultra-short pulse fiber laser 22 and enters a broadband optical spectrum-generating optical fiber 24 of 5 m in length.
Figure 5:
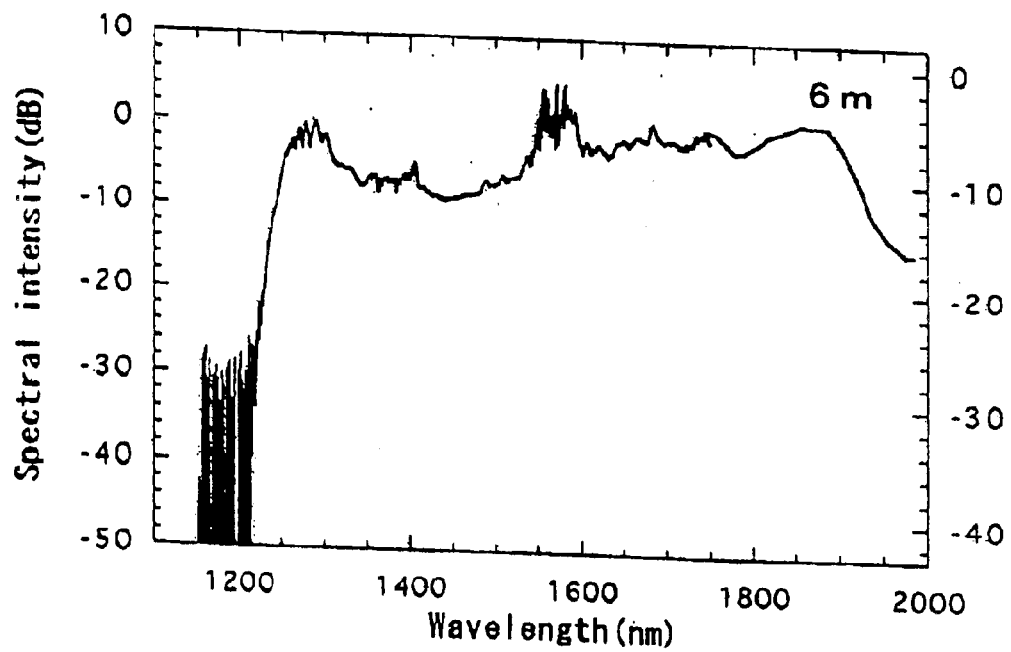
FIG. 5 is a graph showing an observed output spectrum when pulsed light having a mean output of 25 mW is emitted from an ultra-short pulse fiber laser 22 and enters a broadband optical spectrum-generating optical fiber 24 of 6 m in length.
Figure 6:
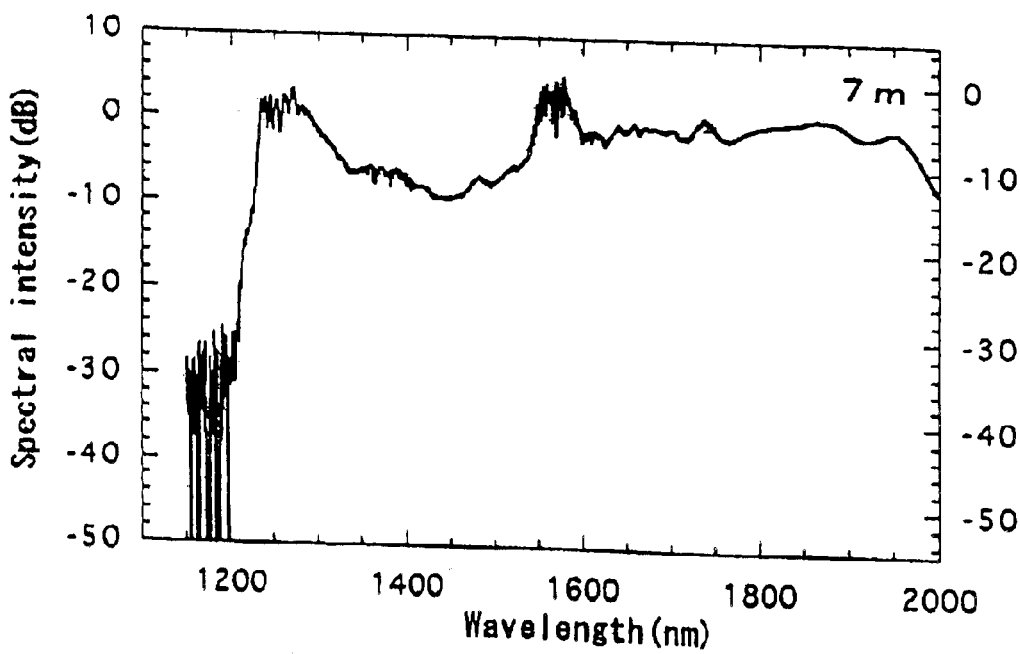
FIG. 6 is a graph showing an observed output spectrum when pulsed light having a mean output of 25 mW is emitted from an ultra-short pulse fiber laser 22 and enters a broadband optical spectrum-generating optical fiber 24 of 7 m in length.
Figure 7:
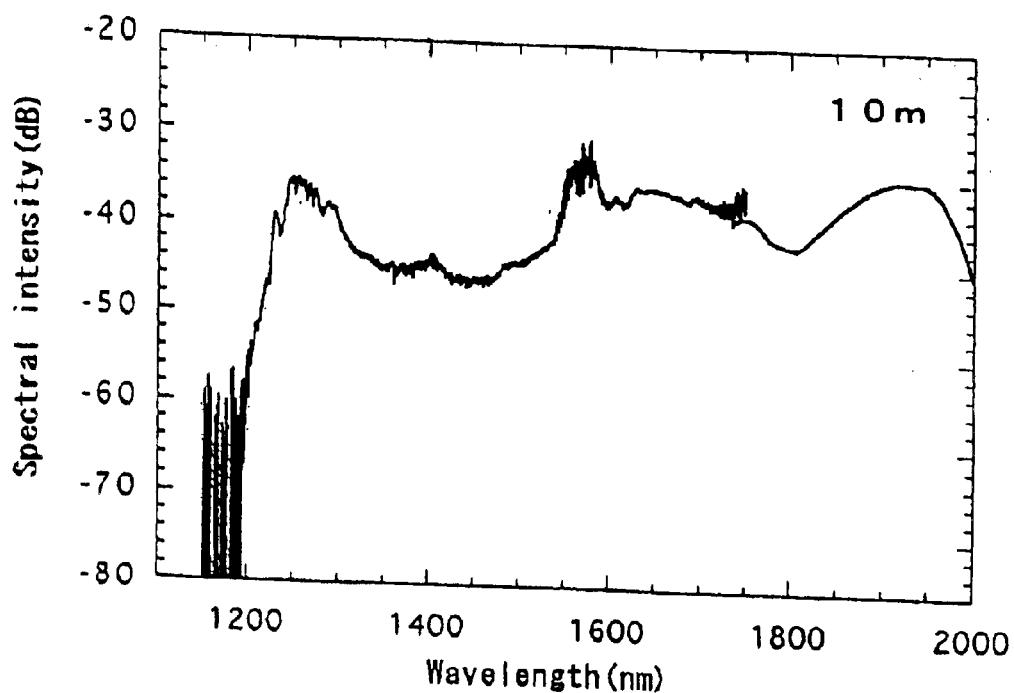
FIG. 7 is a graph showing an observed output spectrum when pulsed light having a mean output of 25 mW is emitted from an ultra-short pulse fiber laser 22 and enters a broadband optical spectrum-generating optical fiber 24 of 10 m in length.
Figure 8:
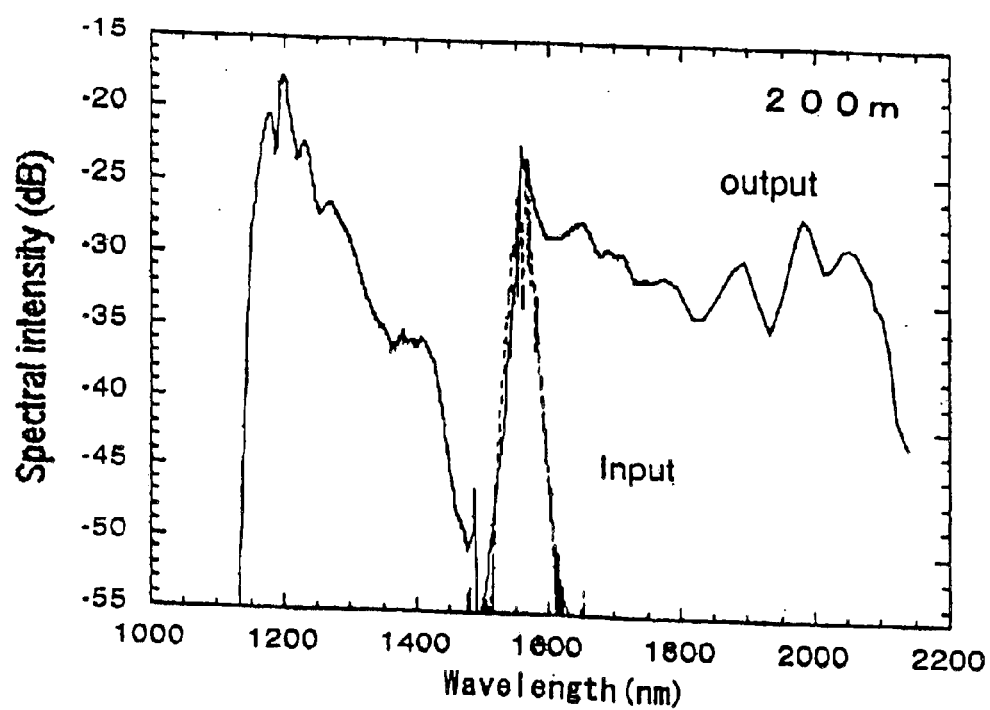
FIG. 8 is a graph showing an observed output spectrum when pulsed light having a mean output of 25 mW is emitted from an ultra-short pulse fiber laser 22 and enters a broadband optical spectrum-generating optical fiber 24 of 200 m in length.
Figure 9:
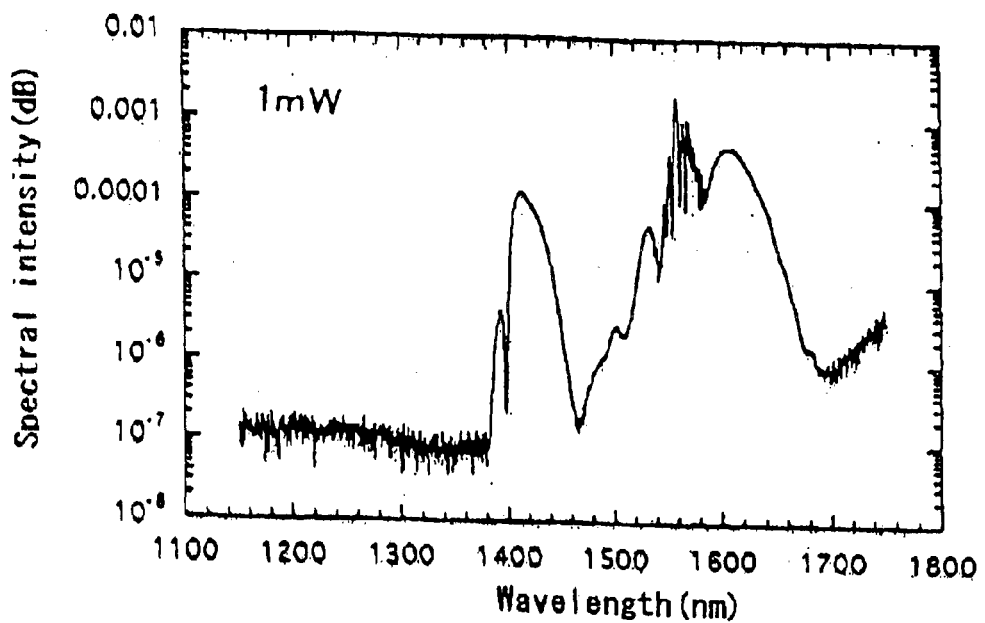
FIG. 9 is a graph showing an observed output spectrum when the broadband optical spectrum-generating optical fiber 24 has a length of 5 m and the pulsed light emitted from the ultra-short pulse fiber laser 22 has a mean output of 1 mW.
Figure 10:
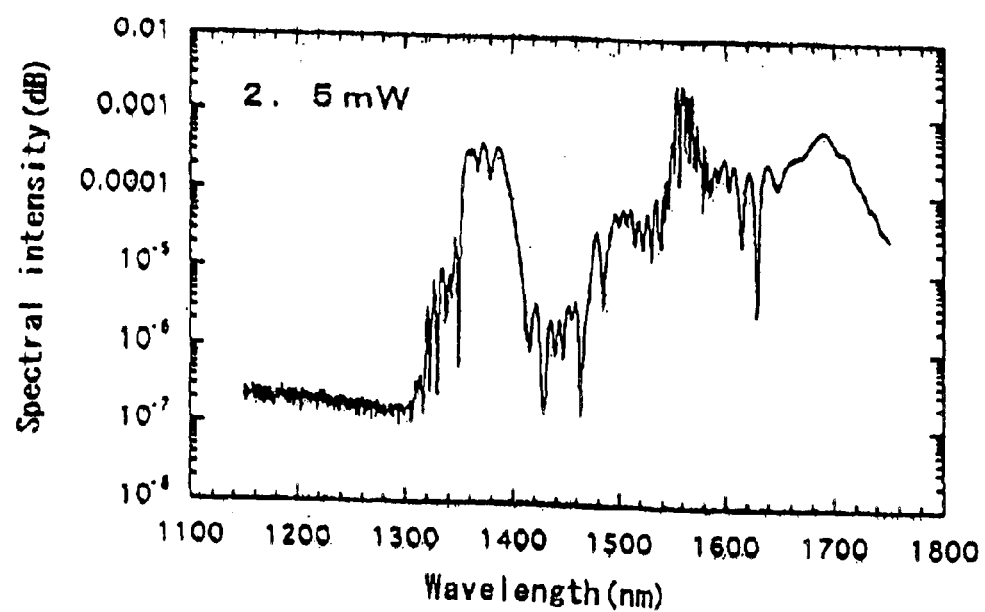
FIG. 10 is a graph showing an observed output spectrum when the broadband optical spectrum-generating optical fiber 24 has a length of 5 m and the pulsed light emitted from the ultra-short pulse fiber laser 22 has a mean output of 2.5 mW.
Figure 11:
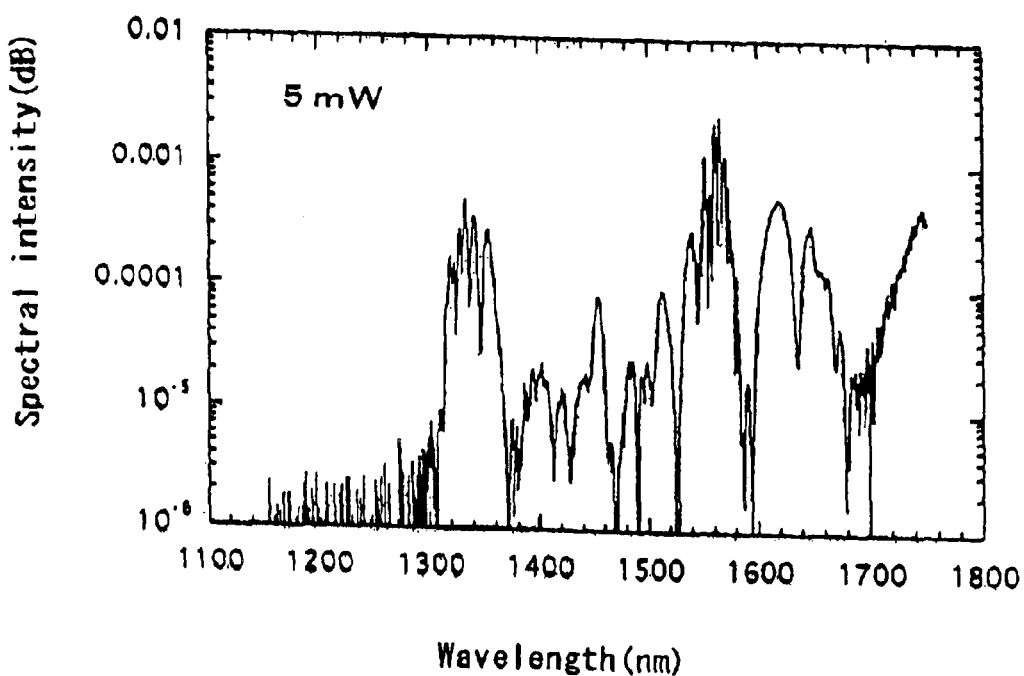
FIG. 11 is a graph showing an observed output spectrum when the broadband optical spectrum-generating optical fiber 24 has a length of 5 m and the pulsed light emitted from the ultra-short pulse fiber laser 22 has a mean output of 5 mW.
Figure 12:
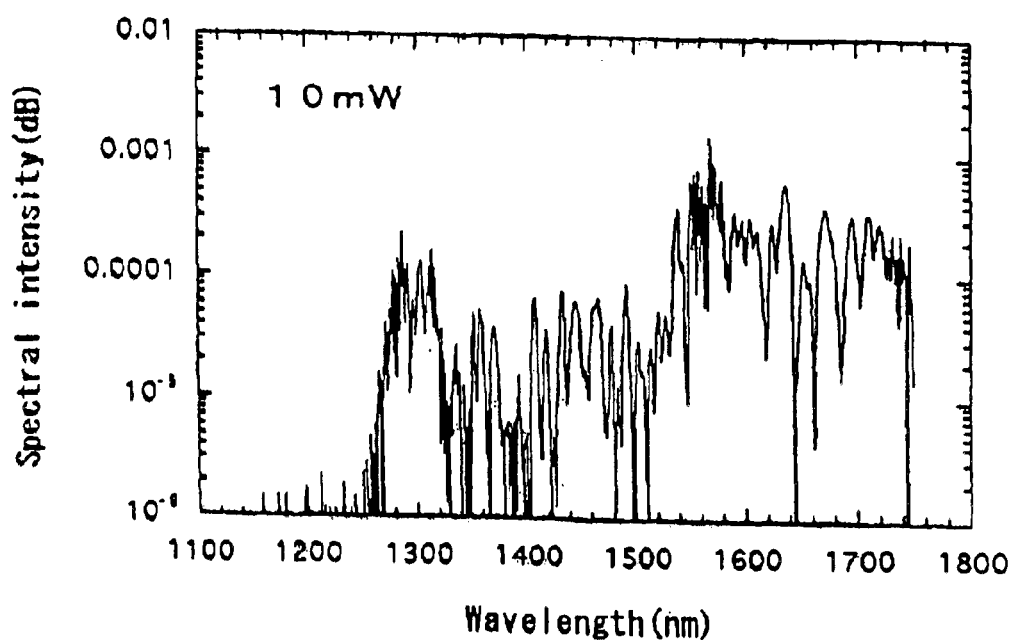
FIG. 12 is a graph showing an observed output spectrum when the broadband optical spectrum-generating optical fiber 24 has a length of 5 m and the pulsed light emitted from the ultra-short pulse fiber laser 22 has a mean output of 10 mW.
Figure 13:
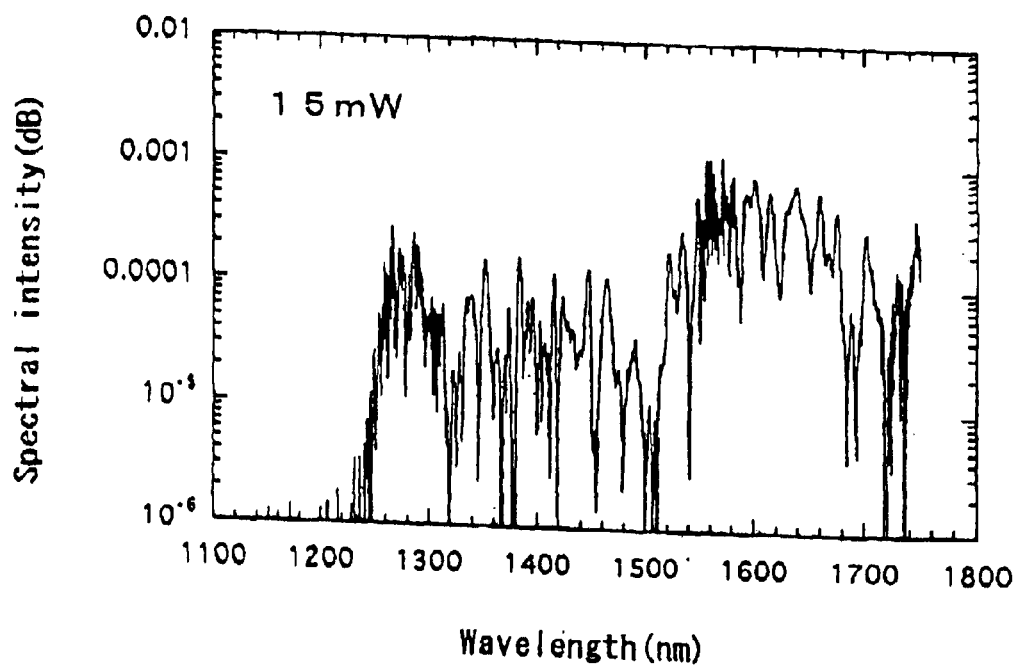
FIG. 13 is a graph showing an observed output spectrum when the broadband optical spectrum-generating optical fiber 24 has a length of 5 m and the pulsed light emitted from the ultra-short pulse-fiber laser 22 has a mean output of 15 mW.
Figure 14:
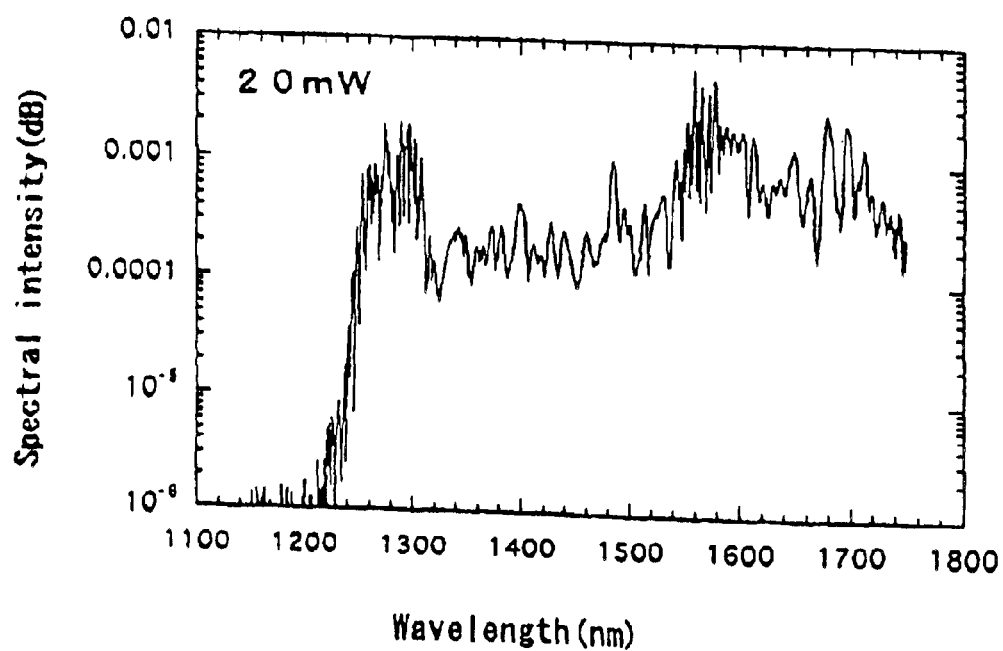
FIG. 14 is a graph showing an observed output spectrum when the broadband optical spectrum-generating optical fiber 24 has a length of 5 m and the pulsed light emitted from the ultra-short pulse fiber laser 22 has a mean output of 20 mW.
Figure 15:
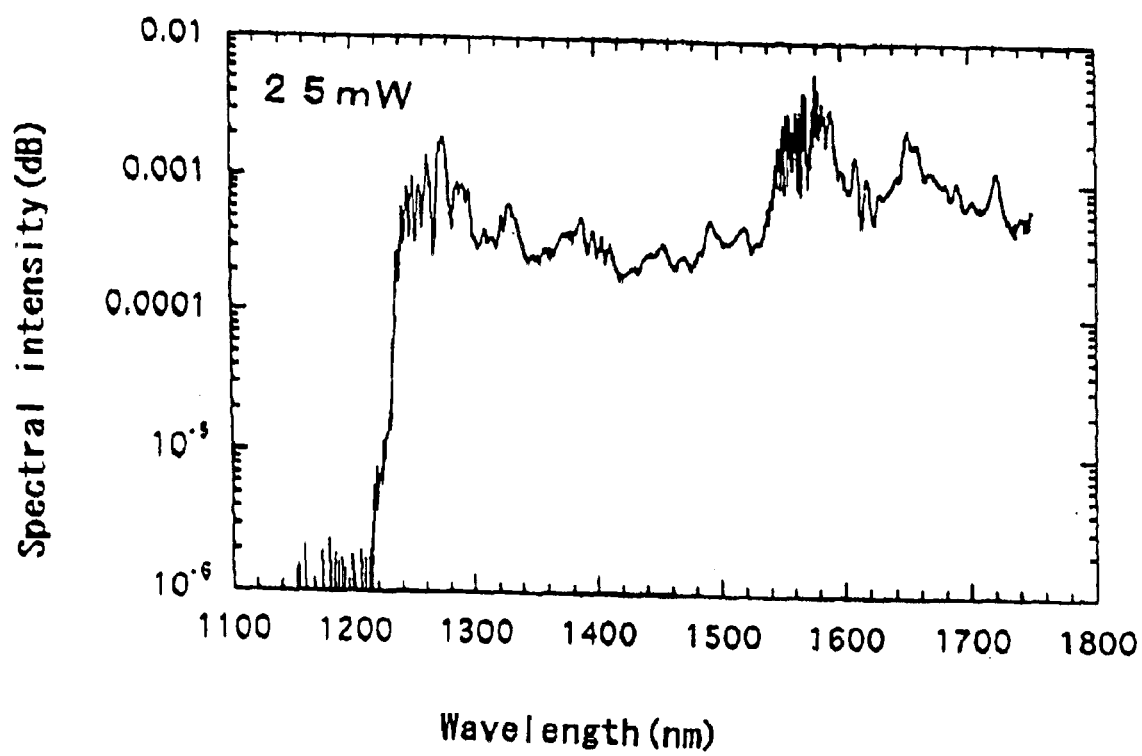
FIG. 15 is a graph showing an observed output spectrum when the broadband optical spectrum-generating optical fiber 24 has a length of 5 m and the pulsed light emitted from the ultra-short pulse fiber laser 22 has a mean output of 25 mW.

One mode of carrying out the invention is discussed below as a preferred embodiment. FIG. 1 schematically illustrates the construction of a broadband optical spectrum generating apparatus 20 in one embodiment of the invention. The broadband optical spectrum generating apparatus 20 of the embodiment includes an ultra-short pulse fiber laser 22 that generates pulsed light having a pulse width in the unit of picosecond to femtosecond, and a broadband optical spectrum-generating optical fiber 24 that is connected with the ultra-short pulse fiber laser 22 via a lens 26 to convert the pulsed light from the ultra-short pulse fiber laser 22 into a broadband optical spectrum.

The ultra-short pulse fiber laser 22 used in this embodiment stably generates ultra-short pulsed light having a pulse width of 110 femtoseconds (fs), a central wavelength of output pulse in the vicinity of 1556 nm, a frequency of 50 MHz, and a mean output of 60 mW. The ultra-short pulse fiber laser 22 preferably has a narrower pulse width and a higher peak output of the pulsed light. According to the relation between the pulse width and the peak output of the pulsed light, sufficiently high peak outputs of the pulsed light ensure favorable results even under the condition of relatively wide pulse widths.

A desirable example of the broadband optical spectrum-generating optical fiber 24 is a highly non-linear dispersion shifted optical fiber. The preferable properties of the broadband optical spectrum-generating optical fiber 24 are a non-linear coefficient of not less than 10 $[W^{-1}m^{-1}]$ relative to the wavelength of the input pulsed light and the magnitude of chromatic dispersion of not greater than 2.0 [ps/km/nm], more preferably of not greater than 1.5 [ps/km/nm], or most preferably of not greater than 1.0 [ps/km/nm]. A polarization maintaining type is desirable. The broadband optical spectrum-generating optical fiber 24 used in this embodiment is a polarization maintaining, highly non-linear dispersion shifted optical fiber having a mode field diameter of 3.8 $\mu$m at a wavelength of the input pulsed light of 1.55 $\mu$m, the non-linear coefficient of 21 $[W^{-1}m^{-1}]$, and the magnitude of chromatic dispersion of 1 [ps/km/nm]. In the case of silica glass optical fibers, the smaller light propagating cross section and the greater load of germanium dioxide ($GeO_2$) as an additive to the core enhances the non-linearity. In the case of the polarization maintaining, highly non-linear dispersion shifted optical fiber, the non-linearity is adjustable by regulating the light propagating cross section and the load of an additive. The broadband optical spectrum-generating optical fiber 24 is produced by a general manufacturing method of optical fibers.

The lens 26 used in this embodiment has a diameter of 2 mm and a focal distance of 2 mm and functions to make the pulsed light emitted from the ultra-short pulse fiber laser 22 enter the broadband optical spectrum-generating optical fiber 24. A pulsed light output terminal of the ultra-short pulse fiber laser 22 is made of an optical fiber. The lens 26 is thus not required in the case of direct connection of the output terminal of the ultra-short pulse fiber laser 22 with the broadband optical spectrum-generating optical fiber 24.

The following describes the properties of the broadband optical spectrum generating apparatus 20 of the embodiment constructed as discussed above. FIGS. 2 through 8 are graphs showing spectra observed at the output side of the broadband optical spectrum-generating optical fiber 24, when pulsed light having a mean output of 25 mW, a pulse peak intensity of 4.734 kW, and an energy per pulse of 520 pJ is emitted from the ultra-short pulse fiber laser 22 and enters the broadband optical spectrum-generating optical fiber 24 of various fiber lengths. The pulses about a wavelength of 1556 nm shown by the dotted lines represent the pulsed light emitted from the ultra-short pulse fiber laser 22. The fiber lengths of the broadband optical spectrum-generating optical fiber 24 sequentially change as 1 m, 3 m, 5 m, 6 m, 7 m, 10 m, and 200 m from FIG. 2 to FIG. 8. According to the graphs of FIGS. 2 through 8, relatively flat super continua were observed over a broad band of 1200 nm to 2000 nm in the spectra with regard to the fiber length range of 3 m to 10 m. No experiments were specifically performed with regard to optical fibers having fiber lengths in a range of 10 m to 200 m. It is, however, readily expected that good super continua would be obtained in the case of fiber lengths of 20 m and 30 m. Good super continua can thus be obtained in the case of the fiber length of not greater than 50 m. These results show that the broadband optical spectrum-generating optical fiber 24 to give a good super continuum in the broadband optical spectrum generating apparatus 20 of the embodiment has a fiber length of 1 m to 50 m, preferably a fiber length of 3 m to 10 m, or more preferable a fiber length of 5 m to 7 m, when the pulsed light emitted from the ultra-short pulse fiber laser 22 has a mean output of 25 mW. The fiber lengths of 1 m to 200 m and even the fiber lengths of greater than 200 m are applicable to give simply broadband optical spectra, if the flatness of the super continuum is not required.

FIGS. 9 through 15 are graphs showing spectra observed at the output side of the broadband optical spectrum-generating optical fiber 24 with a variation in mean output of the pulsed light emitted from the ultra-short pulse fiber laser 22, when the broadband optical spectrum-generating optical fiber 24 has a fixed length of 5 m. The mean output of the pulsed light sequentially changes as 1 mW, 2.5 mW, 5 mW, 10 mW, 15 mW, 20 mW, and 25 mW from FIG. 9 to FIG. 15. According to the graphs of FIGS. 9 through 15, good super continua were observed when the pulsed light emitted from the ultra-short pulse fiber laser 22 has mean outputs of not less than 20 mW. The pulsed light from the ultra-short pulse fiber laser 22 having mean outputs of not less than 2.5 mW, mean outputs of not less than 5 mW, mean outputs of not less than 10 mW, or even mean outputs of not less than 15 mW are applicable to give simply broadband optical spectra, if the flatness of the super continuum is not required.

The observed relation between the mean output of the pulsed light emitted from the ultra-short pulse fiber laser 22 and the length of the broadband optical spectrum-generating optical fiber 24 was that the greater fiber length tends to generate a broadband optical spectrum even under the condition of small mean outputs of the pulsed light. The sufficiently large mean output of the pulsed light ensures good super continua even when the fiber length is not greater than 1 m. The sufficiently long fiber length as 20 m or 30 m, on the other hand, ensures good super continua even when the pulsed light has small mean outputs. As described previously, based on the relation between the pulse width and the peak output of the pulsed light, the sufficiently high peak output of the pulsed light ensures favorable broadband optical spectra even under the condition of wide pulse widths.

As described above, the broadband optical spectrum generating apparatus 20 of the embodiment uses the ultra-short pulse fiber laser 22 that generates the pulsed light having a pulse width in the unit of picosecond to femtosecond, and the broadband optical spectrum-generating optical fiber 24 that has the non-linear coefficient of not less than 10 $[W^{-1}m^{-1}]$ relative to the wavelength of the input pulsed light and the magnitude of chromatic dispersion of not greater than 1.5 [ps/km/nm] as the properties. This arrangement gives a broadband optical spectrum in a range of approximately 1200 nm to 2000 nm or more specifically in a range of approximately 1300 nm to 1900 nm, which significantly exceeds the conventional spectrum band of 1400 nm to 1700 nm. Relatively flat super continua over a broad band of approximately 1200 nm to 2000 nm are obtained when the pulsed light emitted from the ultra-short pulse fiber laser 22 has a mean output of not less than 20 mW and the broadband optical spectrum-generating optical fiber 24 has lengths of 1 m to 50 m, preferably lengths of 3 m to 10 m, or more preferably lengths of 5 m to 7 m.

The broadband optical spectrum generating apparatus 20 of the embodiment uses only the single ultra-short pulse fiber laser 22. This arrangement effectively reduces the size and simplifies the structure of the whole broadband optical spectrum generating apparatus 20. In the broadband optical spectrum generating apparatus 20 of the embodiment, the length of the broadband optical spectrum-generating optical fiber 24 is in the range of 1 m to 50 m, preferably in the range of 3 m to 10 m, or more preferably in the range of 5 m to 7 m. This arrangement desirably reduces the size of the whole broadband optical spectrum generating apparatus 20, compared with the conventional apparatus using an optical fiber of several hundred meters or even several kilometers.

Figure 16:
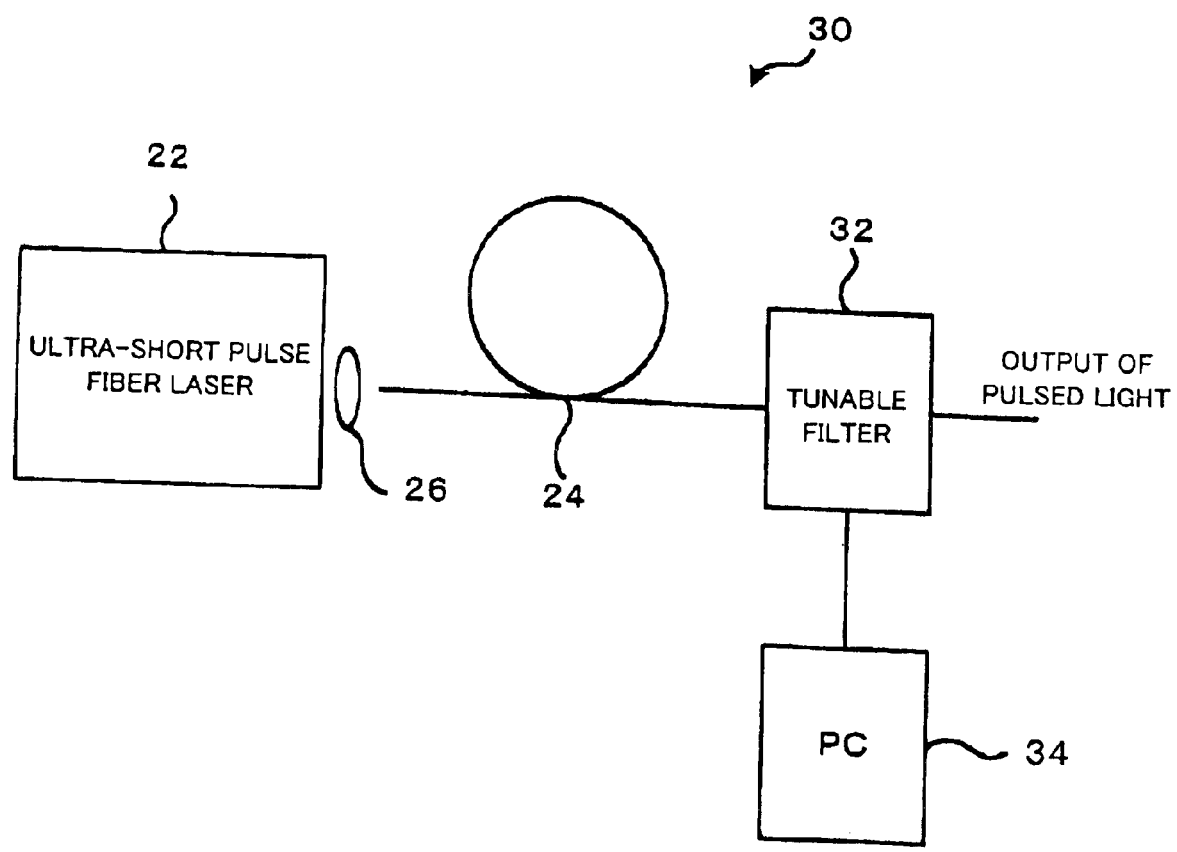
FIG. 16 schematically illustrates the construction of a pulsed light generating apparatus 30 in one embodiment of the invention.

The broadband optical spectrum generating apparatus 20 of the embodiment is incorporated in a pulsed light generating apparatus 30 of an embodiment. FIG. 16 schematically illustrates the construction of the pulsed light generating apparatus 30 in the embodiment of the invention. The pulsed light generating apparatus 30 of the embodiment has a tunable filter 32 that varies a transmission wavelength in response to a driving signal output from a computer 34. The tunable 32 is connected to the output side of the broadband optical spectrum generating apparatus 20 of the embodiment, which includes the ultra-short pulse fiber laser 22, the broadband optical spectrum-generating optical fiber 24, and the lens 26.

The tunable filter 32 may be, for example, a grating spectrometer, a prism spectrometer, or an acousto-optical modulator. An acousto-optical modulator is applied for the tunable filter 32 of this embodiment. The acousto-optical modulator readily varies the transmission wavelength by giving a driving signal to a built-in driver. In the structure of the embodiment, a control signal output from the computer 34 is input into a built-in driver of the acousto-optical modulator, so as to freely adjust the transmission wavelength of the tunable filter 32.

The pulsed light generating apparatus 30 of the embodiment thus constructed adjusts the transmission wavelength of the tunable filter 32 relative to the broadband super continuum in a range of approximately 1200 nm to 2000 nm or more specifically in a range of approximately 1300 nm to 1900 nm, which is generated by the broadband optical spectrum generating apparatus 20 of the embodiment, and thereby outputs pulsed light of a desired wavelength in the obtained super continuum band. The computer 34 functions to adjust the transmission wavelength of the tunable filter 32. This arrangement enables pulsed light of a desired wavelength to be output according to a desired practice, for example, output of sequentially varying transmission wavelengths from the shorter to the longer or vice versa in the super continuum band.

In the pulsed light generating apparatus 30 of the embodiment, the transmission wavelength of the tunable filter 32 is adjusted by the computer 34. The computer 34 may, however, be omitted from the pulsed light generating apparatus 30, if not required.

The above embodiment is to be considered in all aspects as illustrative and not restrictive. There may be many modifications, changes, and alterations without departing from the scope or sprit of the main characteristics of the present invention. All changes within the meaning and range of equivalency of the claims are therefore intended to be embraced therein.

What is claimed is:

1. A broadband optical spectrum generating apparatus that generates a broadband optical spectrum, said broadband optical spectrum generating apparatus comprising:

a short pulse light source that emits pulsed light at a short interval; and a broadband optical spectrum-generating optical fiber that has a non-linear coefficient of not less than 10 $[W^{-1}m^{-1}]$ at a wavelength of the pulsed light emitted from said short pulse light source and converts the pulsed light input from said short pulse light source into the broadband optical spectrum.

2. A broadband optical spectrum generating apparatus in accordance with claim 1, wherein said broadband optical spectrum-generating optical fiber has a length of not greater than 50 m.

3. A broadband optical spectrum generating apparatus in accordance with claim 1, wherein said broadband optical spectrum-generating optical fiber has a magnitude of chromatic dispersion of not greater than 2 [ps/km/nm].

4. A broadband optical spectrum generating apparatus in accordance with claim 1, wherein said broadband optical spectrum-generating optical fiber is a polarization maintaining optical fiber.

5. A broadband optical spectrum generating apparatus in accordance with claim 1, wherein said short pulse light source outputs the pulsed light having a central wavelength of output pulse in a vicinity of 1556 nm and a pulse width in a unit of picosecond to femtosecond.

6. A broadband optical spectrum generating apparatus in accordance with claim 1, wherein said short pulse light source outputs the pulsed light having a pulse width in a range of 10 to 100 femtoseconds and a mean output of not less than 20 mW.

7. A broadband optical spectrum generating apparatus in accordance with claim 1, wherein the broadband optical spectrum is relatively flat over a band of 1300 nm to 1900 nm.

8. A broadband optical spectrum generating apparatus in accordance with claim 1, said broadband optical spectrum generating apparatus further comprising a lens that is interposed between said short pulse light source and said broadband optical spectrum-generating optical fiber to make the pulsed light from said short pulse light source enter said broadband optical spectrum-generating optical fiber.

9. A pulsed light generating apparatus that generates pulsed light of a desired wavelength in a preset wavelength band, said pulsed light generating apparatus comprising:

broadband optical spectrum generation section comprising a short pulse light source that emits pulsed light at a short interval, and a broadband optical spectrum-generating optical fiber that has a non-linear coefficient of not less than 10 $[W^{-1}m^{-1}]$ at a wavelength of the pulsed light emitted from said short pulse light source and converts the pulsed light input from said short pulse light source into a broadband optical spectrum; and optical spectrum extraction section that receives a supply of the broadband optical spectrum from said broadband optical spectrum generation section and extracts an optical spectrum of an arbitrary wavelength from the received broadband optical spectrum.

10. A pulsed light generating apparatus in accordance with claim 9, wherein said optical spectrum extraction section comprises a tunable filter that varies a wavelength of transmitted light.

11. A pulsed light generating apparatus in accordance with claim 9, wherein said optical spectrum extraction section comprises an extracted wavelength regulator that regulates the extracted wavelength in response to an electric signal.

12. A pulsed light generating apparatus in accordance with claim 9, wherein said broadband optical spectrum-generating optical fiber is regulated to have a length of not greater than 50 m.

13. A pulsed light generating apparatus in accordance with claim 9, wherein said broadband optical spectrum-generating optical fiber is regulated to have a magnitude of chromatic dispersion of not greater than 2 [ps/km/nm].

14. A pulsed light generating apparatus in accordance with claim 9, wherein said broadband optical spectrum-generating optical fiber is a polarization maintaining optical fiber.

15. A pulsed light generating apparatus in accordance with claim 9, wherein said short pulse light source outputs the pulsed light having a central wavelength of output pulse in a vicinity of 1556 nm and a pulse width in a unit of picosecond to femtosecond.

16. A pulsed light generating apparatus in accordance with claim 9, wherein said short pulse light source outputs the pulsed light having a pulse width in a range of 10 to 100 femtoseconds and a mean output of not less than 20 mW.

17. A short pulse light source that is included in a broadband optical spectrum generating apparatus, which generates a broadband optical spectrum, and emits pulsed light to a broadband optical spectrum-generating optical fiber, which converts the pulsed light into the broadband optical spectrum, said short pulse light source outputting the pulsed light having a central wavelength of output pulse in a vicinity of 1556 nm and a pulse width in a unit of picosecond to femtosecond.

18. A broadband optical spectrum-generating optical fiber that is included in a broadband optical spectrum generating apparatus, which generates a broadband optical spectrum, and converts pulsed light input from a short pulse light source into the broadband optical spectrum, said broadband optical spectrum-generating optical fiber having a non-linear coefficient of not less than 10 $[W^{-1}m^{-1}]$ at a wavelength of the pulsed light emitted from said short pulse light source.

19. A broadband optical spectrum-generating optical fiber in accordance with claim 18, said broadband optical spectrum-generating optical fiber being regulated to have a length of not greater than 50 m.

20. A broadband optical spectrum-generating optical fiber in accordance with claim 18, said broadband optical spectrum-generating optical fiber having a magnitude of chromatic dispersion of not greater than 2 [ps/km/nm].

21. A broadband optical spectrum-generating optical fiber in accordance with claim 18, said broadband optical spectrum-generating optical fiber being a polarization maintaining optical fiber.

* * * * *